(12) United States Patent  
Foygel et al.

(10) Patent No.: US 7,996,367 B2
(45) Date of Patent: Aug. 9, 2011

(54) AUTOMATIC DOCUMENT EXCHANGE WITH DOCUMENT SEARCHING CAPABILITY

(75) Inventors: Dan A. Foygel, Oakland, CA (US); Jason M. Lemkin, Los Altos, CA (US); Jeffrey M. Zwelling, Burlingame, CA (US)

(73) Assignee: Echosign, Inc., Palo Alto, CA (US)

( * ) Notice: Subject to any disclaimer, the term of this patent is extended or adjusted under 35 U.S.C. 154(b) by 398 days.

(21) Appl. No.: 11/654,390

(22) Filed: Jan. 17, 2007

(65) Prior Publication Data

US 2007/0198533 A1    Aug. 23, 2007

Related U.S. Application Data

(60) Provisional application No. 60/760,222, filed on Jan. 18, 2006.

(51) Int. Cl.
   *G06F 17/30* (2006.01)
(52) U.S. Cl. ......... 707/668; 707/707; 707/783; 709/229
(58) Field of Classification Search ............... 707/1–10, 707/200–205; 713/175–176; 715/741
   See application file for complete search history.

(56) References Cited

U.S. PATENT DOCUMENTS

| | | | |
|---|---|---|---|
| 5,008,853 A | 4/1991 | Bly et al. | |
| 5,465,299 A | 11/1995 | Matsumoto et al. | |
| 5,606,609 A | 2/1997 | Houser et al. | |
| 5,615,268 A | 3/1997 | Bisbee et al. | |
| 5,748,738 A | 5/1998 | Bisbee et al. | |
| 5,790,790 A | 8/1998 | Smith et al. | |
| 5,832,499 A | 11/1998 | Gustman | |
| 5,910,987 A | 6/1999 | Ginter et al. | |
| 5,987,429 A | 11/1999 | Maritzen et al. | |
| 6,021,202 A | 2/2000 | Anderson et al. | |
| 6,039,248 A | 3/2000 | Park et al. | |
| 6,049,787 A | 4/2000 | Takahashi et al. | |
| 6,061,448 A | 5/2000 | Smith et al. | |
| 6,085,322 A | 7/2000 | Romney et al. | |
| 6,105,012 A | 8/2000 | Chang et al. | |
| 6,141,753 A | 10/2000 | Zhao et al. | |
| 6,185,563 B1 | 2/2001 | Hino | |
| 6,199,052 B1 | 3/2001 | Mitty et al. | |
| 6,202,056 B1 | 3/2001 | Nuttall | |
| 6,219,423 B1 | 4/2001 | Davis | |
| 6,237,096 B1 | 5/2001 | Bisbee et al. | |
| 6,253,322 B1 | 6/2001 | Susaki et al. | |
| 6,260,145 B1 | 7/2001 | Komura et al. | |

(Continued)

FOREIGN PATENT DOCUMENTS

WO    96/41463 A1    12/1996

(Continued)

*Primary Examiner* — Debbie Le
(74) *Attorney, Agent, or Firm* — Dardi & Herbert, PLLC; Peter S. Dardi

(57) ABSTRACT

The exchange of documents for execution can be performed efficiently using an automated system that routes and stores documents based on routing information. Routing may be accomplished with reminders for individuals of deadline for responding. After execution is confirmed, an executed copy may be forwarded to all parties and desired non-parties. If execution or approval is desired from a plurality of individuals, documents received from each of the plurality of individuals can be merged into a single, fully executed document if the approval/signatures are obtained simultaneously. Search capability for identifying data regarding the document, text within the document, or both may also be provided.

26 Claims, 12 Drawing Sheets

U.S. PATENT DOCUMENTS

| | | | |
|---|---|---|---|
| 6,289,460 B1 | 9/2001 | Hajmiragha | |
| 6,314,517 B1 | 11/2001 | Moses et al. | |
| 6,327,611 B1 | 12/2001 | Everingham | |
| 6,367,013 B1 | 4/2002 | Bisbee et al. | |
| 6,452,691 B1 | 9/2002 | Marshall | |
| 6,470,448 B1 | 10/2002 | Kuroda et al. | |
| 6,516,328 B1 | 2/2003 | Mori et al. | |
| 6,584,466 B1 | 6/2003 | Serbinis et al. | |
| 6,587,945 B1 | 7/2003 | Pasieka | |
| 6,622,162 B2 | 9/2003 | Kawasaki et al. | |
| 6,625,642 B1 | 9/2003 | Naylor et al. | |
| 6,671,805 B1 | 12/2003 | Brown et al. | |
| 6,678,705 B1 * | 1/2004 | Berchtold et al. | 707/204 |
| 6,757,826 B1 | 6/2004 | Paltenghe | |
| 6,851,053 B1 | 2/2005 | Liles et al. | |
| 6,898,707 B1 | 5/2005 | Sit et al. | |
| 6,925,182 B1 | 8/2005 | Epstein | |
| 6,944,648 B2 | 9/2005 | Cochran et al. | |
| 6,959,382 B1 | 10/2005 | Kinnis et al. | |
| 6,963,971 B1 | 11/2005 | Bush et al. | |
| 6,990,504 B2 | 1/2006 | Powell et al. | |
| 7,146,343 B2 * | 12/2006 | Donahue | 705/80 |
| 7,243,127 B2 | 7/2007 | Tabayoyon, Jr. et al. | |
| 7,254,588 B2 | 8/2007 | Sung et al. | |
| 7,360,079 B2 | 4/2008 | Wall | |
| 7,373,365 B2 | 5/2008 | Varadarajan et al. | |
| 7,437,421 B2 * | 10/2008 | Bhogal et al. | 709/206 |
| 7,587,369 B2 | 9/2009 | Ginter et al. | |
| 7,720,729 B2 | 5/2010 | Wilce et al. | |
| 2002/0002563 A1 | 1/2002 | Bendik | |
| 2002/0059144 A1 | 5/2002 | Meffert et al. | |
| 2002/0129056 A1 * | 9/2002 | Conant et al. | 707/511 |
| 2003/0037261 A1 | 2/2003 | Meffert et al. | |
| 2003/0056100 A1 * | 3/2003 | Beatson | 713/176 |
| 2003/0140010 A1 * | 7/2003 | Patterson et al. | 705/76 |
| 2004/0078337 A1 * | 4/2004 | King et al. | 705/51 |
| 2004/0088340 A1 | 5/2004 | Idicula et al. | |
| 2005/0022198 A1 | 1/2005 | Olapurath et al. | |
| 2005/0094192 A1 * | 5/2005 | Harris et al. | 358/1.15 |
| 2005/0132195 A1 * | 6/2005 | Dietl | 713/176 |
| 2006/0036934 A1 * | 2/2006 | Fujiwara | 715/500 |
| 2006/0069926 A1 | 3/2006 | Ginter et al. | |
| 2006/0277123 A1 | 12/2006 | Kennedy et al. | |
| 2007/0083554 A1 | 4/2007 | Crume et al. | |
| 2008/0097777 A1 * | 4/2008 | Rielo | 705/1 |
| 2008/0147790 A1 | 6/2008 | Malaney et al. | |

FOREIGN PATENT DOCUMENTS

| | | |
|---|---|---|
| WO | WO 01/99388 A3 | 12/2001 |
| WO | WO 03/009200 A1 | 1/2003 |

* cited by examiner

FIG. 4

AUTOMATIC DOCUMENT EXCHANGE WITH DOCUMENT SEARCHING CAPABILITY

CROSS REFERENCE TO RELATED APPLICATIONS

This application claims priority to copending U.S. provisional patent application Ser. No. 60/760,222 filed on Jan. 18, 2006 to Zwelling et al., entitled "Document Exchange, Interaction and Archiving Facilitated by the Internet," incorporated herein by reference.

FIELD OF THE INVENTION

The invention relates to improved automated approaches to document handling relating to execution of agreements, contracts and the like. In particular, automatic exchange of documents can be performed through one or more pathways, such as fax machines, the internet or the like, with document scanning capability, which can further be used for automated verification that the execution of the document was performed. The invention further relates to suitable hardware and software for implementing the automated procedures.

BACKGROUND OF THE INVENTION

The growth of the information age has placed ever greater demands on most people's time and organizational abilities. There are growing amounts of information that needs to be managed in a reasonable way. At the same time, the information age has made it possible to send information at fast rates over essentially any relevant distance. This information is generally transmitted over extensive optical and/or electrical wire networks which may also interface with wireless radio communication, satellite relay, microwave communication or similar wireless communication channels. These communication channels tie into conventional phone lines or Internet based computer networks. The format of the signal can be adjusted with correspondingly appropriate electrical, optical or other routing information such that telecommunication equipment can direct the information to the appropriate portals.

While fax machines and email provide very rapid and efficient mechanisms for the transfer of information, they do not inherently organize the vast amounts of information transmitted over these channels. In carrying out business relationships, documents are exchanged for signature. While modern document delivery channels provide for rapid document exchange, much of the corresponding efficiencies may be lost by the need to manually organize and track the document distribution.

SUMMARY OF THE INVENTION

In a first aspect, the invention pertains to a method for exchanging documents for execution. The method may comprise some or all the steps of receiving routing information and identifying metadata, automatically storing a document from an input source specified in the routing information, routing the document, and providing search capability for identifying data regarding the document or text within the document without providing editing capability. The document is stored along with data automatically generated and structured based on the routing information and metadata. The document may be routed before or after providing search capability to signatories for execution.

In a second aspect of the invention pertaining to a method for exchanging documents for execution, the image of a document returned by an individual on a routing list may be compared with the record or image of a document forwarded to the individual in an automated routine. In general, it is not necessary to use the full image, but information from the image can be abstracted into a record. Through this step, the system may confirm that the form of the returned document matches expected parameters corresponding to execution of the document.

In a third aspect of the invention pertaining to a method for exchanging documents for execution, reminders of due dates may be generated through scanning a document uploaded into the system for dates. The document may be routed automatically for signature according to routing information with reminders for the individual of a deadline for responding.

In a fourth aspect of the invention pertaining to a method for exchanging documents for execution, routing information may be received from an individual initiated the document execution process. One or more new system accounts based on email addresses for individuals connected with the routing information may be generated automatically if accounts doe not already exist for these individuals.

In a fifth aspect of the invention pertaining to a method for exchanging documents for execution, the method may comprises some or all of the steps of automatically routing a document for signature based on routing information input at the initiation of the document exchange process, receiving the document following execution by individuals on a routing list to complete execution of the document, and automatically forwarding an executed copy of the document to a non-party based on the routing information.

In a sixth aspect of the invention pertaining to a method for exchanging documents for execution among a plurality of signatories, the method may comprise some or all of the steps of routing a document for signature to a plurality of signatories using a single action based on information received at the initiation of the document exchange process, receiving an executed document from each of the plurality of signatories, and merging the executed segments of the executed documents into a single fully executed document.

In a seventh aspect of the invention pertaining to a method for exchanging documents for execution, a document may be automatically routed for signature to five or more signatories. In such a case, the system may automatically track who has and who has not signed and automatically follow up with those who have not signed.

BRIEF DESCRIPTION OF THE DRAWINGS

FIG. 4 is an illustration of an embodiment of a system for performing the steps related to receiving routing information.

DETAILED DESCRIPTION OF THE INVENTION

Figure 1:
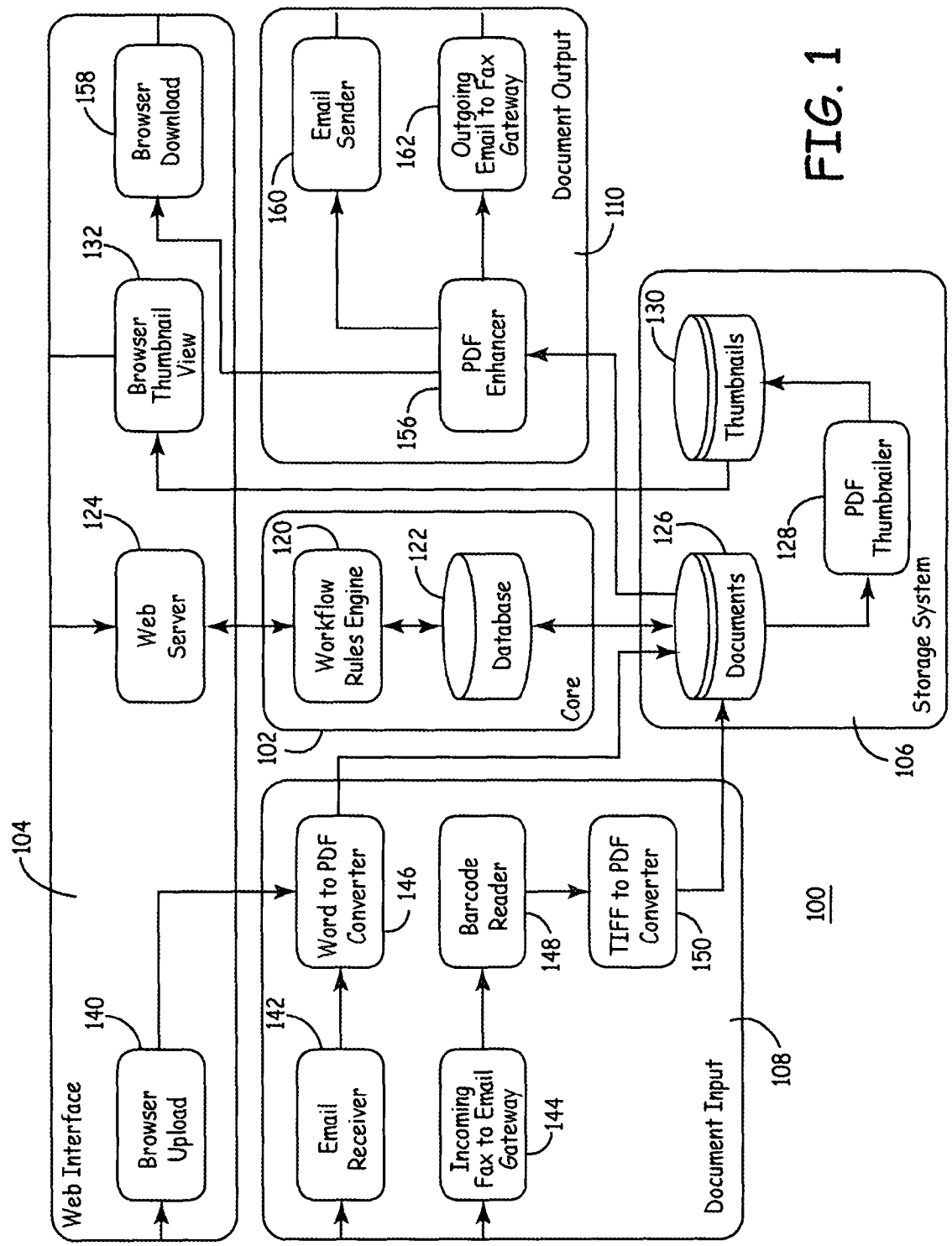
FIG. 1 is a schematic view of an embodiment of a system for document exchange.

Efficiencies of document execution and storage can be greatly enhanced through an automated system that inputs routing information and the document for execution and then routes the document of execution until requested signatures are obtained. This process can be combined with archiving of the executed document for later reference. Execution of a document refers to obtaining signatures, and the "signatures" can be electronic or physical signatures. To obtain physical signatures, the system can interface with a facsimile document output and/or input, although scanned documents can be input by way of email or other network directed interface. To perform the routing, the document can be associated with metadata that uniquely identifies the document. In some embodiments, the automated system can facilitate document preparation and document exchange between negotiating parties. Furthermore, the automated system can facilitate document archiving for documents executed through the system as well as other documents input for archiving. Appropriate computing systems can be used to implement the document management services. These computer systems are interfaced with appropriate input and output channels as well as an internet interface.

In particular, further efficiencies for document execution and storage may be obtained through an automatic system that leads parties through the process of executing the document with little or no human intervention once an originator provides the initial instructions. Generally, the process of executing a document may include receiving routing information from an originator, storing a document from a source specified in the routing information, and routing the document to the recipients (or signatories). The system is capable of storing all executed documents whether executed through the system or other means for easy management of documents in one place.

The system can provide parties enhanced abilities to review the documents. This may include search capability for originators and recipients to search for identifying data about or within the document. This enhances the ability of parties to efficiently extract information from the document to speed review and ultimate processing.

The system may also provide for the step of verifying document execution. This may include checking the integrity of the document execution. If document execution is not satisfactory, the document may be routed until execution is satisfactory. In this step, the system may also detect and correct errors without any intervention by the parties. For physical signatures, the documents can be automatically reviewed for image changes expected with the proper placement of the signature. Image changes can be abstracted into a record based on sampling of the image. For example, the image can be examined at 100 points across a page or some other number for inclusion in a record. Then, the record can be compared with data obtained from a received image. Any selected subset of information from the image can be placed into a record for comparison as an alternative of a complete comparison of the images.

Further efficiencies for document execution may be obtained in the situation involving a plurality of signatories. In such event, the process may also include routing the document for signature to the signatories using a single action, receiving an executed document from each of the plurality of recipients, and merging executed segments of each of the executed documents into a single, fully executed document.

Execution of a document may involve obtaining approval or signatures on the document. These signatures may be electronic signatures or physical signatures of any suitable form. A particular document may invite one or more signatures, such as two or three signatures. Physical signatures may be obtained through fax, e-mail, or other network directed interface.

One or more documents can be executed simultaneously under automated system supervision. A document may be a contract, purchase order, confidentiality agreement, lease, deed, receipt, bill of sale, letter of engagement, or other legal or commercial document. A document may require approval rather than a formal legal signature, such as an approval of a change order, insertion order, or work instructions. The user may provide a separate document or use a form provided by the system.

To obtain physical signatures, the system can interface with a facsimile document output and/or input, although scanned documents can be input by way of email or other network directed interface. To perform the routing, the document can be associated with metadata that uniquely identifies the document. Appropriate computing systems can be used to implement the document management services. These computer systems are interfaced with appropriate input and output channels as well as an internet interface.

The document handling system generally automates a document execution process through the intake of the document and routing instructions, routing of the document and the presentation of the executed document. This exchange can be performed within a secured environment. The exchange of documents and/or instructions can be directed electronic through the Internet or a combination of the Internet and facsimile formatted documents over the phone lines. In particular, routing instructions are generally input through the Internet at a web page and document transfer can take place either over the internet or over fax connections. To maintain this flexibility for document transfer, the system generally maintains connections both through the Internet and through phone lines for facsimile transmitting and receiving.

The system is able to intelligently route documents through the association of a document with metadata which is provided generally by one or more parties associated with the documents. Metadata in the context of the world-wide-web has become associated with directing information used to guide a browser to websites of interest. These have been described as data-about-data or information-about-information that provides a labeling, cataloging or descriptive function. As used herein, the term metadata is used in an even broader sense as cataloging/labeling information that identifies a document and related information across media such as in a printed format or an electronic format. Also, the metadata is only decodable by the system such that the metadata is not for general use by others using the same data channels. In some embodiments, the metadata has different formats depending on whether or not it is an electronic format or physical format.

The terms Internet and World-Wide-Web should be given broad scope. Specifically, these should include the existing international computer networks that provide email and website access broadly to individuals that have addressed the network as well as any future manifestations of a broadly accessible computer network. These networks can comprise electrically wired, optical, wireless satellite, wireless microwave, wireless radio communication channels that interconnect users. Suitable networks include also private networks.

Functionality can be manipulated by format conversion. At appropriate stages in a document execution process, it is desirable to restrict or prevent modification of a document. However, temporary conversion to another format can be accommodated for providing temporary functionality, such as searching. Thus, the document handling system can maintain a robust version of the document while providing a party with a version that can be searched or otherwise manipulated separate from the temporary document. In other embodiments, the document handling system provides search capability of the robust version of the document without allowing any modification of the document. These functionalities can be provided on a secure web site or web service, or on downloaded versions of the document.

To accomplish the objectives with desired levels of flexibility, the system generally comprises one or more central server(s) with a core computer(s) connected to a suitable database. The database is associated with a storage system. The core interfaces with one or more input channel(s) and output channel(s). The input channel and output channel each have an interface with the world-wide-web or other email data transmission network and in some cases a fax transmission connection. The core computer also can have an interface with a web server that provides for an exchange with a user connected through a web page. Initial instructions for initiating a transaction can be input from a website which prompts a user for all of the appropriate information to control the transaction, although the input can be entered in alternative mechanisms, including web services and web interfaces, among others.

A particular transaction is initiated through the receipt of a service order. The service order provides instructions for carrying out a transaction including appropriate routing information. For security and billing purposes, the user-originator generally enters a user name and password or other identifying information to associate the originator with identifying information known to the system. Metadata for identifying the document are generated based on the instructions as well as the parties. A request for the document is forwarded appropriately to the originator based on the particular instructions.

For security purposes, billing purposes and general system management purposes, parties to documents are signed up as official users of the system. Official users of the system generate user names and passwords that identify them to the system. Similarly, other appropriate contact information, such as fax number(s), e-mail address(es), phone numbers, mailing address and/or the like, is associated with each official user.

When the originator of a document is not a system user, appropriate information is collected at the time that the transaction is initiated. For each transaction, the secondary parties are checked against the database of system users to identify whether or not the party is already a registered system user. If one of the secondary parties is not already a system user, the system automatically generates a new system account associated with this user. Additional information needed to establish a system account is collected when the document is forwarded for execution and/or in a separate communication with the new system user.

The document for the transaction can be input, for example, through a post to a web site, a direct or indirect interface with a web server or web service, an email message, or a fax according to the instructions in the service order. The originator then forwards the document with the associated metadata by the prescribed input channel to the central server. The document can be converted to a common format, which is generally an image representation of the document. While temporary electronic versions can be generated for various manipulations, the document handling system can monitor the integrity of the document for execution. In some embodiments, the document following input is not to be altered except for signature of the document.

In some embodiments, the system provides text searching capability to the system users either in documents pending full execution and/or in archived executed documents. In other embodiments, the system itself scans the document text and/or image to obtain information to facilitate the system procedures. For example, the document scan can involve the identification of a signature block area, which can be used to monitor execution of the document. Similarly, the document scan can involve the identification of dates that can be used to provide deadlines for reminding the parties of the status of the process. Large volume users can instruct the system of specific procedures to follow for all or an identifiable subset of the user's documents.

The document and metadata are forwarded sequentially and/or simultaneously to the signatories according to the instructions. The signed documents are received and verified. This process is repeated and/or monitored until the signatory instructions have been satisfied. Then, the originator and other appropriate individuals are notified that the transaction is completed and the completed document is provided to appropriate individuals through selected channels, such as a facsimile or secure website.

Regardless of the mechanism for document transfer and execution, the process can be made more efficient through the implementation of automated signature verification. For physical signatures, signature verification can involve the identification of a signature block on the unexecuted document and the identification of a marking at the signature block after putative execution. For electronic signatures, appropriate electronic verification is performed to provide a desired level of security. For electronically signed documents, the physical image of the document can be altered at the identified signature block to visually indicate the electronic signature.

Of course, the system is designed generally to facilitate a plurality of transactions both simultaneously and sequentially. Another dimension of the system capabilities involves the archiving and organization of the executed documents from the transactions. Once a document is fully executed, the parties are appropriately notified. If the instructions provide appropriate instructions, the executed document can be forwarded to a non-party and/or the non-party can be notified as well as provided access to the archived document. In particular, the documents can be organized on a web page in groupings involving the originator as well as with other selected identifiers. Varying degrees of organization can be selected for facilitating the archiving and execution of documents with specific formatting available to a user. In some embodiments, the archived documents can be made accessible to authorized individuals for text searching.

In general, an improved and automated document execution system is described further in copending U.S. patent application Ser. No. 11/652,371, to Foygel et al., filed on Jan. 11, 2007, entitled "Automatic Document Exchange and Execution Management," incorporated herein by reference. Additional improved functionalities that provide automated error detection in the signature/approval process, more efficient review of documents, and/or more effective routing for execution is described herein. Additional aspects of automated document preparation and archiving are disclosed in copending U.S. patent application Ser. No. 11/654,389, to Foygel et al., filed on Jan. 17, 2007, entitled "Automatic Document Exchange With Archiving Capability," incorporated herein by reference.

System for Implementing Document Exchange

In general, the system to implement the processes described herein comprises one or more central servers with one or more processors connected to suitable storage devices with interfaces to appropriate input and output subsystems. The one or more central servers may be in multiple locations and distinct from one another. In some embodiments, the input and output subsystems each comprise both a gateway to the internet and a fax connection to the phone system. These connections provide optional document transmission/receipt as a facsimile document, a browser download, an internet-based notification, or as an email document attachment. In addition, the central server can be connected to the internet such that it can function as a web server, or the central server can be interfaced with a web server and/or web service. While a variety of configurations can be used to assemble the appropriate hardware and software, the common features described herein provide the desired functionality.

The central server can be one computer or a group of interfaced computers that may or may not be at the same physical location. In general, the computers can be commercially available computers such as person computers, servers, main frame computers and the like, such as future renditions of these computers. The input subsystem and output subsystem generally comprise suitable hardware to interface with the respective data channels, and may comprise a processor(s) for file manipulation and/or routing. The data channels can comprise one or more pathways that are presently available or may become available in the future, such as wire connections, optical communication channels, radio channels, microwave channels and the like. The initially received data may or may not then undergo a conversion of format. The conversion of format can be performed by the central server or processors associated with the communication subsystems. In some embodiments, documents are converted to a common format, such as PDF format, for further processing. The web or other network interfaces can also use conventional technology or may be based on future technologies.

One representative configuration for the system is shown in FIG. 1. As shown in FIG. 1, document system 100 comprises core or central server 102, web interface 104, storage system 106, input subsystem 108 and output subsystem 110. The components may interface with each other through a common system bus and/or through a network, through USB, firewire and/or appropriate connections presently available or developed in the future.

Core 102 comprises a computer or a distributed network of interfaced computers that runs software that executes a workflow rules engine 120. Workflow rules engine 120 controls the flow of the processing of documents by the system as well as the archiving process, although these two functions can be handled by distinct software units. Workflow rules engine 120 interfaces with a database 122 on a suitable nonvolatile storage medium, such as a magnetic drive, optical drive or the like. In this embodiment, database 122 stores the status of documents being processed as well as the rules for providing access to archived documents.

Core 102 is interfaced with web interface 104 and storage system 106. Specifically, in this embodiment, core 102 interfaces with a web server 124. In some embodiments, the computer(s) of core 102 can be the web server itself, or the web server 124 can be a separate computer or distributed network of computers. The web server generally provides a website or web or other application interface at which a document originator requests signature of a document and inputs instructions for handling a particular document.

Storage system 106 comprises nonvolatile storage such as a hard drive for storage of documents 126. Storage system 106 can further comprise a processor that runs software that performs document imaging and/or PDF conversion 128. A range of commercially available software can perform the function of generating images, such as Product Scope 32 Pro™ from Encourager Software or MD2 Thumbnailer 1.0. The thumbnail images 130 can be stored for quick access to authorized individuals to view archived documents. Specifically, thumbnail images 130 can be made available, for example, through a browser thumbnail view 132 or the like. Storage system 106 can be interfaced with input channel 108 and output channel 110.

In this embodiment, input subsystem 108 has three gateways for receiving documents, a browser upload 140, an email receiver 142 and an incoming fax gateway 144. Fax gateway 144 can comprise a conventional fax modem or other suitable device for receiving and/or transmitting signals over a phone line. Browser upload 140 receives a file through a website portal, which can include, for example, a web or other application interface. Email receiver 142 receives the file as an attachment to an email message. Incoming fax gateway receives the message over a phone line in facsimile format that may correspond with a particular TIFF format. Input from browser upload 140 or email receiver 142 are checked for format and converted to PDF format, such as from MSWord™ format, if necessary, which can be performed with a PDF converter 146, such as Adobe Acrobat™. An incoming fax can be reviewed with a barcode reader 148 which can identify a bar code on an image file, such as DTK Barcode Reader SDK v 3.0, which can identify several barcode formats, or Barcode Tools from Softek Software. After reading the barcode, the TIFF facsimile file can be converted to a PDF file with a TIFF to PDF converter 150, such as Adobe Acrobat™. Regardless of the gateway through which the document was received, a PDF version of the document along with corresponding metadata can be forwarded to storage system 106 so that core 102 can evaluate the further routing of the document.

In an embodiment, output channel 108 receives documents from storage system 106 and has a connection to three output gateways. Documents from storage system 106 can be processed by a PDF enhancer 156. "PDF Enhancer" is available from Apago Inc., and similar software is available from other vendors. A dedicated computer for the output channel 108 can run the PDF enhancer, or the core computer(s) and/or a processor associated with the storage system 106 can execute the PDF enhancer routine. The enhanced PDF file can then be routed to browser download 158, email sender 160 that send the file as an email attachment, or outgoing email to fax gateway 162, which can be a fax modem or the like.

A person of ordinary skill in the art will recognize that this representative configuration is subject to a range of suitable variations that depend on convenience for a particular environment. For example, instead of or in addition to a PDF, other formats such as JPEG, BMP, PNG, GIF, and others.

A user generally would be able to communicate through web connections with a conventional web browser or internet connection with any appropriate connection generally through to an internet service provider. Similarly, for facsimile transmissions, a commercial fax modem or the like can be used to provide the transmissions. While any reasonable communication protocols can be used for the communications, although standard protocols provide ready compatibility. Fax protocols are generally established by International Telephone Union Telecommunication Standardization Sector (ITU-T), Group 3 for communication over Public Switched Telephone Network (PSTW).

Electronic mail communications similarly have standard protocols, although non-standard protocols can be used if appropriately coordinated. Typically, the Simple Mail transfer Protocol (SMTP) within the TCP/IP (Transmission Control Protocol/Internet Protocol) suite of protocols is used by routers connected to the network. Fax protocols and internet mail protocols are described further in U.S. Pat. No. 6,625,642 to Naylor et al., entitled "System and Process for Transmitting Electronic Mail Using a Conventional Facsimile Device," incorporated herein by reference.

File transfer mediated through a web browser can be performed with File Transfer Protocol (FTP), HTTP, or other suitable protocol. The web browser authorizes the file transfer from the originating computer. The central server can associate the transferred file with the corresponding metadata. In addition, transfer may be done via the use of web services and web interfaces, such as an API.

Method for Document Exchange

The automated procedure described herein for a transaction relating to handling document execution provides an efficient and flexible approach for document handling that is compatible over a range of technologies. In particular, these procedures are extremely efficient at obtaining physical signatures while being flexible to handle electronic signatures as these become acceptable in a broader range of circumstances. Referring a flow diagram in FIG. 2, a representative embodiment of a document execution transaction 200 can generally be considered as comprising four steps. Specifically, transaction 200 comprises receiving instructions 202, receiving and preparing the document 204, routing document for execution 206 and archiving document 208. This diagram depicts the life cycle of document execution through the automated process described herein. Each of these steps generally has a plurality of associated sub-processes, and all aspects of these steps may or may not be done in sequence such that there may be overlap with respect to aspects of the main steps.

Figure 3:
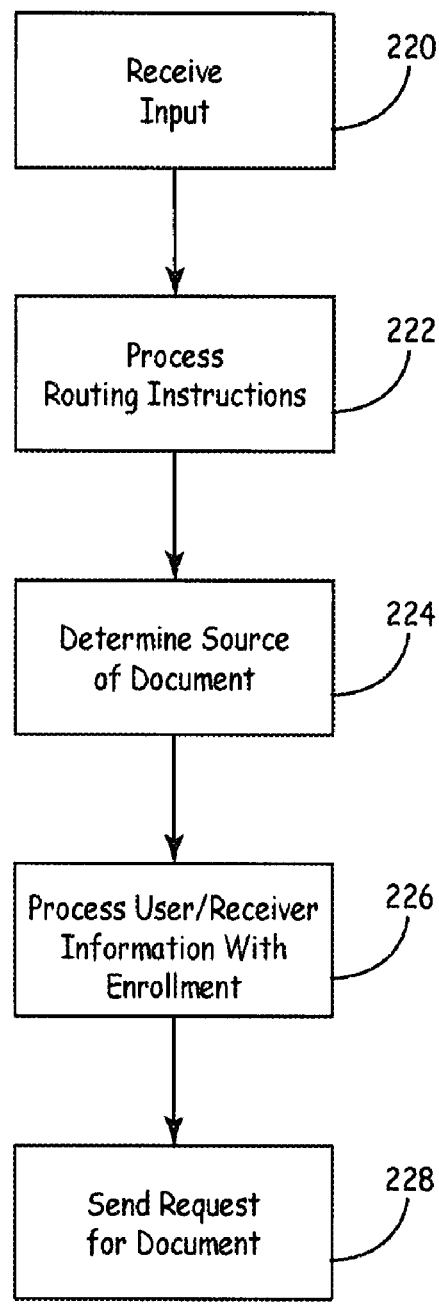
FIG. 3 is a flow diagram of an embodiment of the steps related to receiving routing information.

One embodiment of the process to receive instructions 202 is depicted in FIG. 3. Input is received 220 regarding routing instructions and identification of the originating party. Generally, the input is received by way of a web page through a web browser connected to the internet or other appropriate networking portal. However, information can be initiated through other means, such as written instructions or the like, which can be transcribed into the system to initiate the automated processing.

Figure 4:
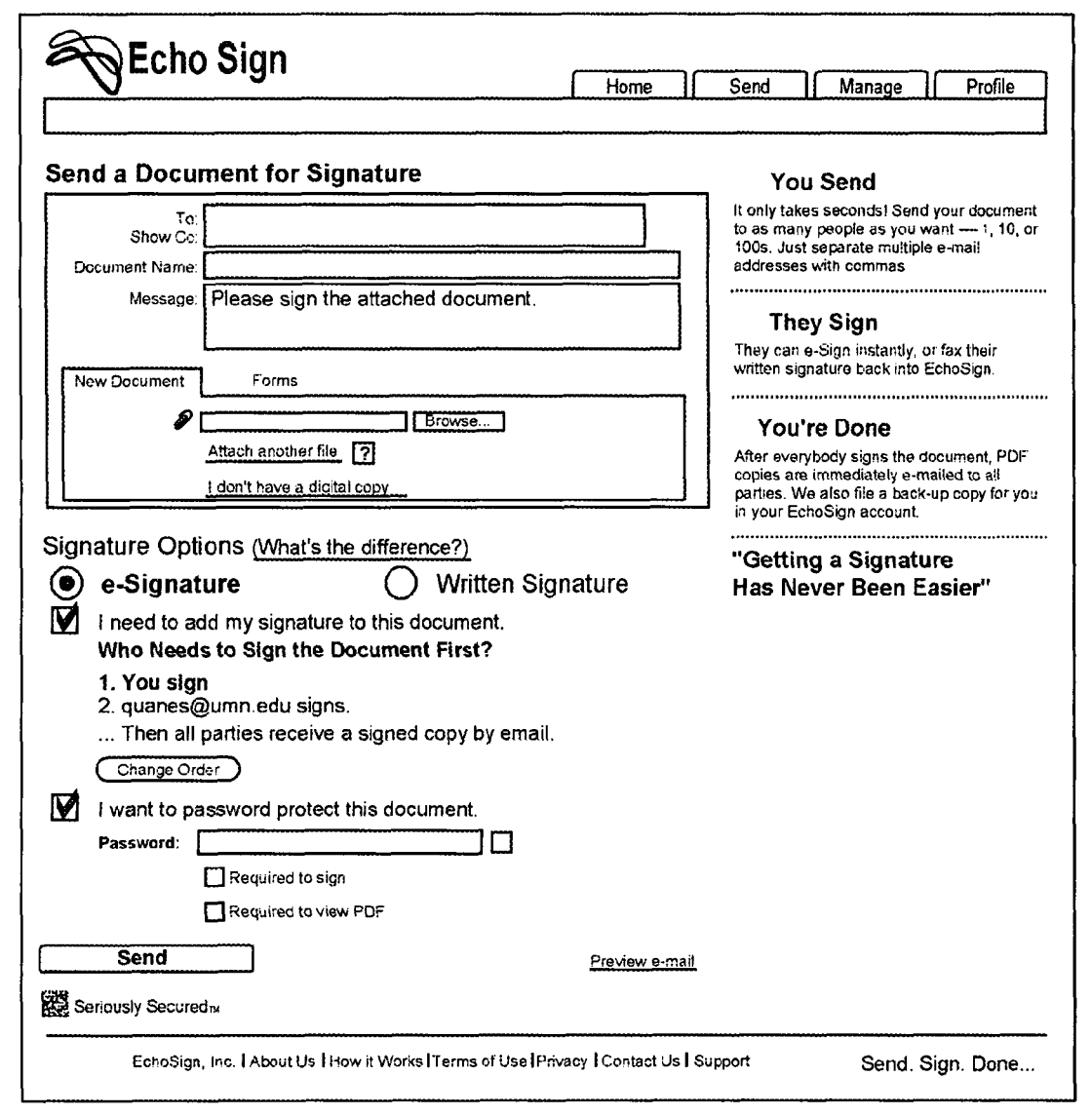

An example of a web screen for receiving input relating to execution of a document is depicted in FIG. 4. Referring to FIG. 4, the user may enter one or more recipient e-mail addresses in the "To:" or "Cc:" line 230, document name 231, and modify or leave unchanged the default message 232. The system may prompt the user to specify whether the document will be a document attached, faxed, or e-mailed to the system or a standardized document provided by the system 233. Either a written or electronic signature may be provided by either the intended recipients and/or the user 234. The system or the user may request only written signatures from either the user or intended recipient or both or only electronic signatures from either the user or intended recipient or both. The user may add their signature to the document and specify the order of signing by the user and intended recipient 235. In this embodiment, the user may password protect the document by specifying either or both that a password be required by the intended recipient to sign or view the PDF 236.

The routing instructions are processed 222 to determine the number of signatures requested, the identity of the at least one signatory, the delivery approach for each signature, the contact information of a signatory, and the requested order of signatures, if more than one signature is requested, which can be obtained sequentially or simultaneously. It can be efficient in some embodiments to simultaneously obtain a plurality of signatures. For example, a process to obtain approval or signatures from a plurality of locations can involve obtaining approval from 2, 5, 10, 100 or more or any value within these ranges of authorized individuals. The input is also examined with respect to a determination of the source of the document 224.

For security purposes as well as in some embodiments for billing purposes, the transaction originator logs into the system for identification purposes. Logging on may occur before or after the originator provides initial instructions. The login information is processed 226 to identify the user within the system. Generally, security is ensured through unique identification of a user. The unique identification can be provided with a user name and password or other suitable identification procedure. A particular signatory does not necessarily need to have a registered login for the system, but an invitation to be a logged-in member generally can be made to provide the full archive capability of the system, which cannot generally be provided for security purposes unless the person is a login member.

One or more new system accounts may be generated automatically based on e-mail addressed of recipient if accounts do not already exist. In some embodiments, the systems list of accounts is cross referenced to the e-mail address provided for the recipient. If an account is not identified with this address, a new account is set up, which can be a tentative account pending confirmation from the recipient. An initial password can be forward, such as by email, to a holder of a new account to provide initial access to the system. The recipient is notified of the new account when contacted regarding the document or separately. The recipient can confirm the new account, provide additional information that allowed the system to provide additional functionality to the account, reject the new account, and/or indicate that an existing account should be associated with the contact information so that a tentative account is merged into an existing account. A person of ordinary skill in the art will recognize that existing software can be adapted in a straightforward way to provide these functionalities.

System accounts can be organized into groups of users. For example, a larger company can have a group of individual users. Similarly, larger groups of users can be organized into subgroups. The user organization into groups and optionally into subgroups can be related to various functionalities of the system. For example, particular members of a group/subgroup can have access to a particular group of archived documents and/or to particular form documents. In general, a group manager is established with the group organization to approve addition or removal of individuals from a group or subgroup. The group manager has authority to change group account information and access within the system.

During or after the user provides the input, a request is made for the document 228. If the document is to be received by way of the web server following receipt of the order instructions, the user may attach the document when providing the input. If the document is to be received by fax, a fax is sent with a return cover sheet to the document originator. The cover sheet may be provided when the user provides the input. The return fax sheet has a barcode representing the metadata to identify the document. A barcode is intended to broadly refer to any image that can represent the metadata so that electronic reading of the image can provide the associated metadata. If the document is to be received by email, a solicitation email can be sent to the originating person. The soliciting email generally can contain a representation of the metadata so that the returned document attached to the reply email can be associated readily with the metadata. In addition, in some cases the metadata can be associated via optical character recognition (OCR) of some or all of the underlying document, which can then be matched to a database of potential documents to associate with the incoming document. OCR can be performed with commercial software, such as NUANCE™, SOFTSCAN™ or ABBYY™.

Figure 5:
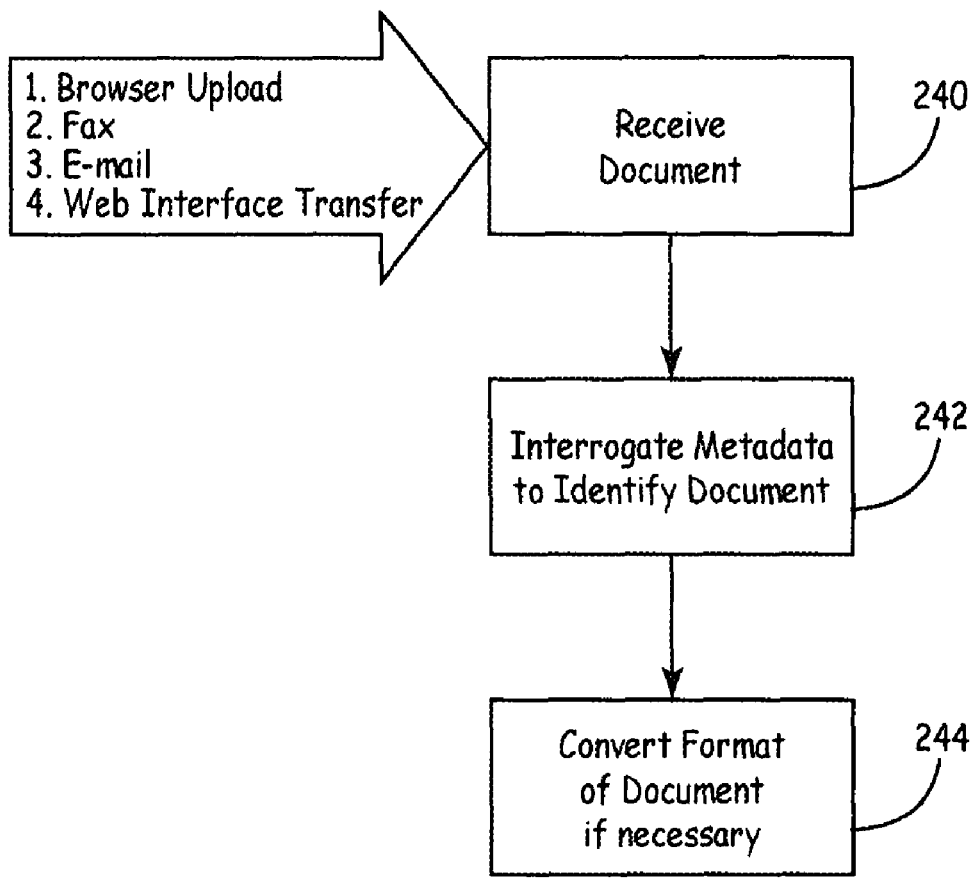
FIG. 5 is a flow diagram of an embodiment of the steps related to receiving and preparing the document for routing.

FIG. 5 is a flow diagram of an embodiment of the steps related to receiving and preparing the document for routing. The receipt and preparation of the document 204 comprises receiving the document 240 based on the request for the document 228. The request for the document 228 initiates a process to receive the document with associated metadata. Following receipt of the document with metadata, the metadata can then be interrogated 242 to identify the document with a particular routing protocol. In general, if the document is received in a word processor format, such as WordPerfect™ or Microsoft-WORD™, the document is generally converted to one or more document or image formats. A PDF format can be used since it is relatively compact with respect to file size and is generally readable by most users, although other formats, such as TIFF formats, can be used if desired. To simplify the discussion, it will be assumed that a PDF format is used. Similarly, if the document is received as a TIFF format, such as by fax or by email, the file can be converted to a PDF format. Thus, regardless of the format of the source document, the document can be converted to a common format 244, if appropriate.

Figure 6:
FIG. 6 is an illustration of an embodiment of a system for performing the steps related to receiving the document via fax and preparing the document for routing.
Figure 7:
FIG. 7 is an example of a fax coversheet that may be used to fax the document into the system.

One or more documents may be uploaded through the web site, transferred through a web interface, faxed, or e-mailed. In the embodiment of FIG. 4, one or more documents may be attached through an input screen, which provides the routing information to the system. FIG. 6 shows an embodiment of a screen illustration appropriate for guiding the steps related to receiving the document via fax and preparing the document for routing. After entering appropriate information, if the user provides instruction to input the document by facsimile, the user may print out a fax coversheet and fax it with the document, and the system inputs the document into the appropriate routing protocol. FIG. 7 is an example of a fax coversheet that may be used to fax the document. Alternatively or additionally, the document can be e-mailed, optionally as an attachment, to the system for forwarding to the intended recipient.

Alternatively, the originator may use a standardized form provided by the system instead of a separate form attached, faxed, e-mailed by the user. The system can be configured to offer one or more forms for particular purposes, such as purchase orders, service orders or the like. In some embodiments, the system can provide an editing function to fill in specific numbers on the form, or the system can pose specific queries to obtain numbers that the system automatically places into the document. In addition, in some embodiments, individual users or user groups can store documents on the system for later use by the individual user or individual users within a user group.

Figure 8:
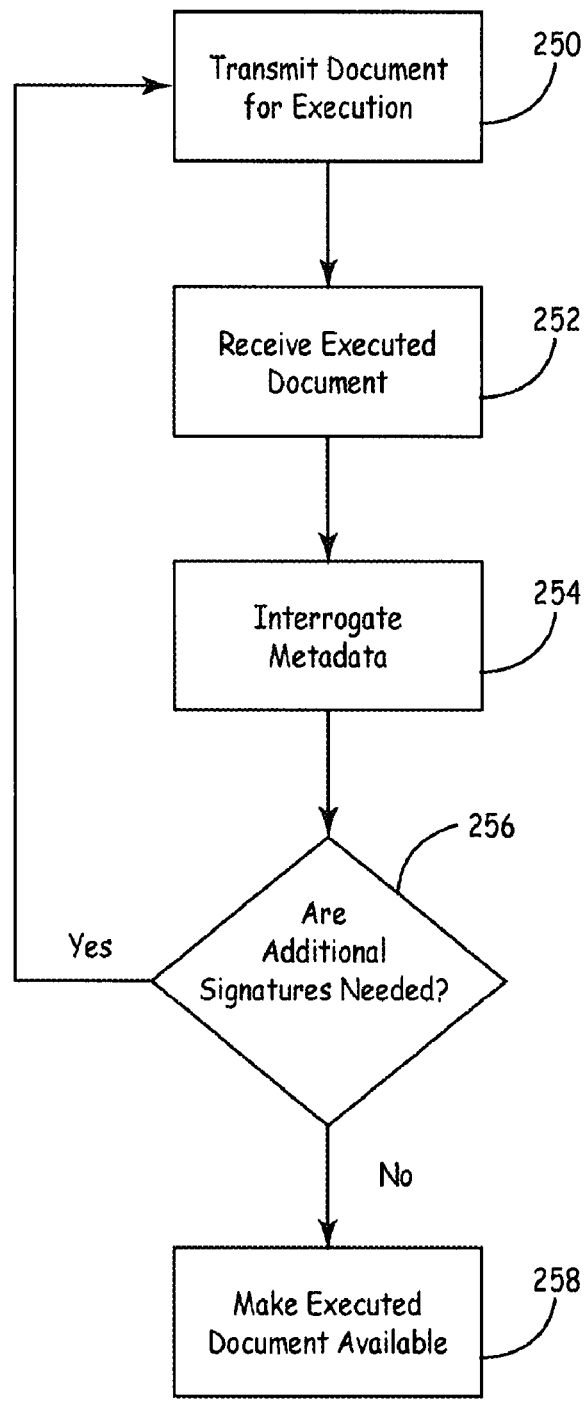
FIG. 8 is a flow diagram of an embodiment of the steps related to routing the document to execute the document or obtain signatures.

The originator can request either a written signature and/or an electronic signature to be provided by either the intended recipients and/or the originator. During the routing process, a user/recipient may receive a document with a request for their approval. FIG. 8 is a flow diagram of an embodiment of the steps related to routing the document 206a for execution or signature. Once converted to a common format, the document is routed for execution 206. Based on the routing information, the document is transmitted 250 to the first signatory. The transmitted document is associated with metadata. If the document for execution is sent by way of facsimile, the metadata can be in the form of a bar code on the return fax cover sheet sent to the signatory with the document. For documents send by email for signature, the metadata can be embedded in the subject ("Re:") line or other convenient location in the message such that it would be available in a reply message.

The recipient may receive the document in a format, such as a physical copy or an electronic format, that is not readily searchable. The system can provide the recipient access through a web site or web service or through an e-mail message of a searchable version of the document. Through the availability of a searchable document, the recipient's review process can be facilitated and made more efficient.

If the document is routed to one or more signatories, particularly five or more signatories, the system can automatically track who has and who has not executed or signed the document and follows up with those who have not executed or signed the document in some embodiments. The ability to automatically track the process with a large number of signatories provided significant advantages of the system. In some embodiments, the systems simultaneously tracks ten or more signatories, and a person of ordinary skill in the art will recognize that specific numbers of signatories within the explicit ranges above are contemplated and are within the present disclosure.

The executed document is received from the signatory 252. For physical signatures, the system may compare the image or a record of a document returned by the recipient with the image of the original document to confirm that the form of the returned document is properly executed. Various image searching software can be adapted for this purpose. A wide range of imagine searching software is available, generally for filtering or for image organization. For example, image scanning software is available from LTU Technologies, Inc., Washington, D.C. The image can be divided into segments for searching to evaluate signature blocks. The comparison may comprise identifying a signature block location prior to distributing the document for execution and evaluating the presence of image darkening at the signature block beyond a predetermined threshold. A suitable predetermined threshold can be evaluated empirically by a person of ordinary skill in the art based on the functionality of the particular image searching software. If a signature is not found during the image scan, the system can automatically prompt the individual regarding their signature to confirm whether or not the document does have their signature.

The remaining portions of the document may be examined for changes in locations not identified as a signature block location. If such a change occurred in portions of the document not in the signature block location, a message may be sent to the signatory inquiring about the modification. If there are any remaining signatories, a message may also be sent to them requesting confirmation of any modification. Record or image comparison may be used to detect errors, such as missing pages from returned document, image damage due to copying errors, inverted image due to faxing, incomplete or incorrect transmission due to malfunctioned fax or wrong document was returned, and/or the like. Parties may be notified of such errors if detected.

For embodiments in which an electronic signature or other electronic approval is provided, the document image can be altered to reflect the electronic signature/confirmation. This can be performed automatically through the identification in the document of the signature block. Then, an image indicating the electronic signature/confirmation can be superimposed at the signature block. Thus, a person examining the image at a later time either during the execution process or following archival of the document can appreciate the status of the document execution.

In general, the document may or may not be returned through the same route that it was sent. For example, if the document was sent by fax, it can be returned by email, and if it was sent by email, it can be returned by facsimile. Appropriate instructions can be sent for alternative return routes to associate the metadata with the document. The returned document can be converted to PDF format or other format, if appropriate. The signature associated with the returned document can be a physical signature that is converted to an image format with the remainder of the document, or an electronic signature in a suitable format, such as one compliant with the E-SIGN Act of 2000.

Referring to FIG. 8, the metadata associated with the returned document is interrogated 254 to associate the document with a particular routing protocol. The routing protocol is then reviewed to determine if execution is complete or additional signatures are requested 256. If the routing protocol calls for additional signatures, the document with the signatures to date is transmitted again to the new signatory 250, and the process of receiving the executed document is repeated.

Once all of the signatures have been obtained according to the routing protocol, the parties may be notified. The document may be made available 258 to the parties. This can be performed in one or more ways. For example, the signed document can be faxed to all of the parties. Also, the signed document can be emailed to all of the parties. In addition, the signed document can be made available through a website and/or using access through web services, such as an API. A combination of one or more of these approaches can be used. In addition, the system can be configured to automatically route the executed/approved document to a non-party. This instruction to route to a non-party generally is provided by the originator. The non-party can be any suitable recipient, such as a supplier of a good or service that is involved with the transaction or, for example, a creditor or other interested organization.

The approach through a website can be combined with an archival process. Routing of the document may comprise reminders for the recipient or signatory of the deadline for responding. The system may generate due dates through examining the document for due dates, which may or may not be confirmed with the transaction originator. Additionally or alternatively, the due dates can be automatically input during the entry of the routing information. In some embodiments, the originator is asked in real time regarding dates found in a review of the document text, and whether or not these dates should be considered deadlines. In additional or alternative embodiments, the originator is asked in an email message regarding due dates from the documents, generally with a response format that can be automatically evaluated. The due date may be determined as a particular date or as a certain period of time relative to when the document is routed to the recipient. In some embodiments, due dates are input into the system by the originator during the session when the routing instructions are provided to the system.

Figure 9:
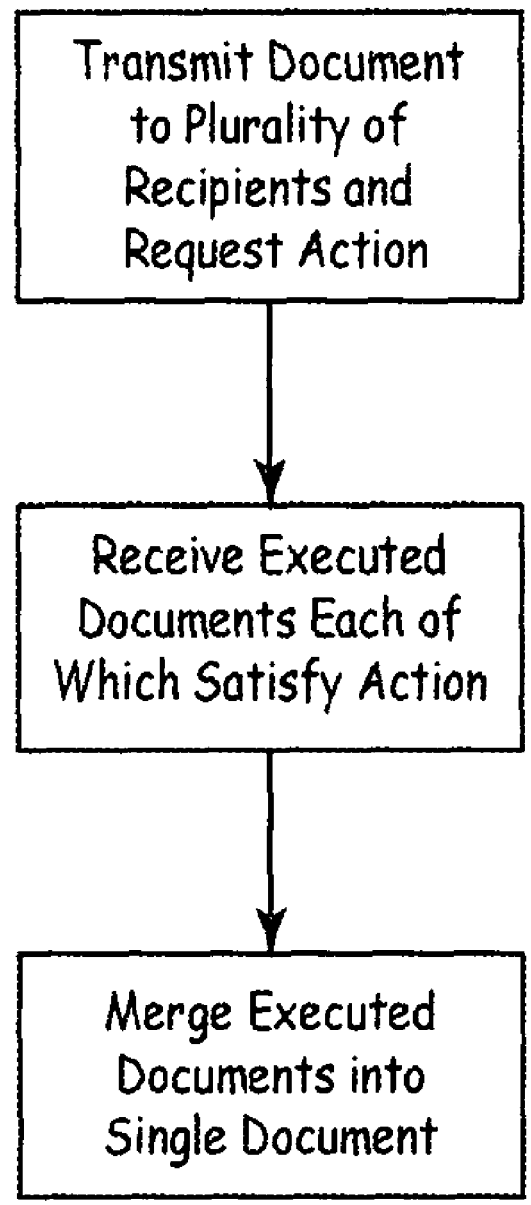
FIG. 9 is a flow diagram of an embodiment of the steps related to routing the document to a plurality of recipients and receiving executed documents from each of the plurality of recipients.

In some embodiments, it may be desirable to speed the execution process through the simultaneous forwarding of the document for execution by a plurality of signatories. The system can be configured so that the originator of the transaction can specify simultaneous transmission for execution. FIG. 9 is a flow diagram of an embodiment of the steps related to routing the document for simultaneous approval, execution or obtaining signatures. If the document is transmitted to a plurality of recipients for execution 260, the system receives an executed document from each of the plurality of recipients 262. Once received, the system can merge the executed documents into a single, fully executed document 264. Merging of the document can comprise combining a plurality of signature pages into the combined document. If appropriate, the system can merge executed signature blocks into the combined document. The plurality of signatories can be 2, 3, 5 or more signatories. In particular, this approach can be appropriate and efficient with larger numbers of signatories, such as 10, 100, 1000, larger number or any numbers of signatories within these specific values.

Figure 10:
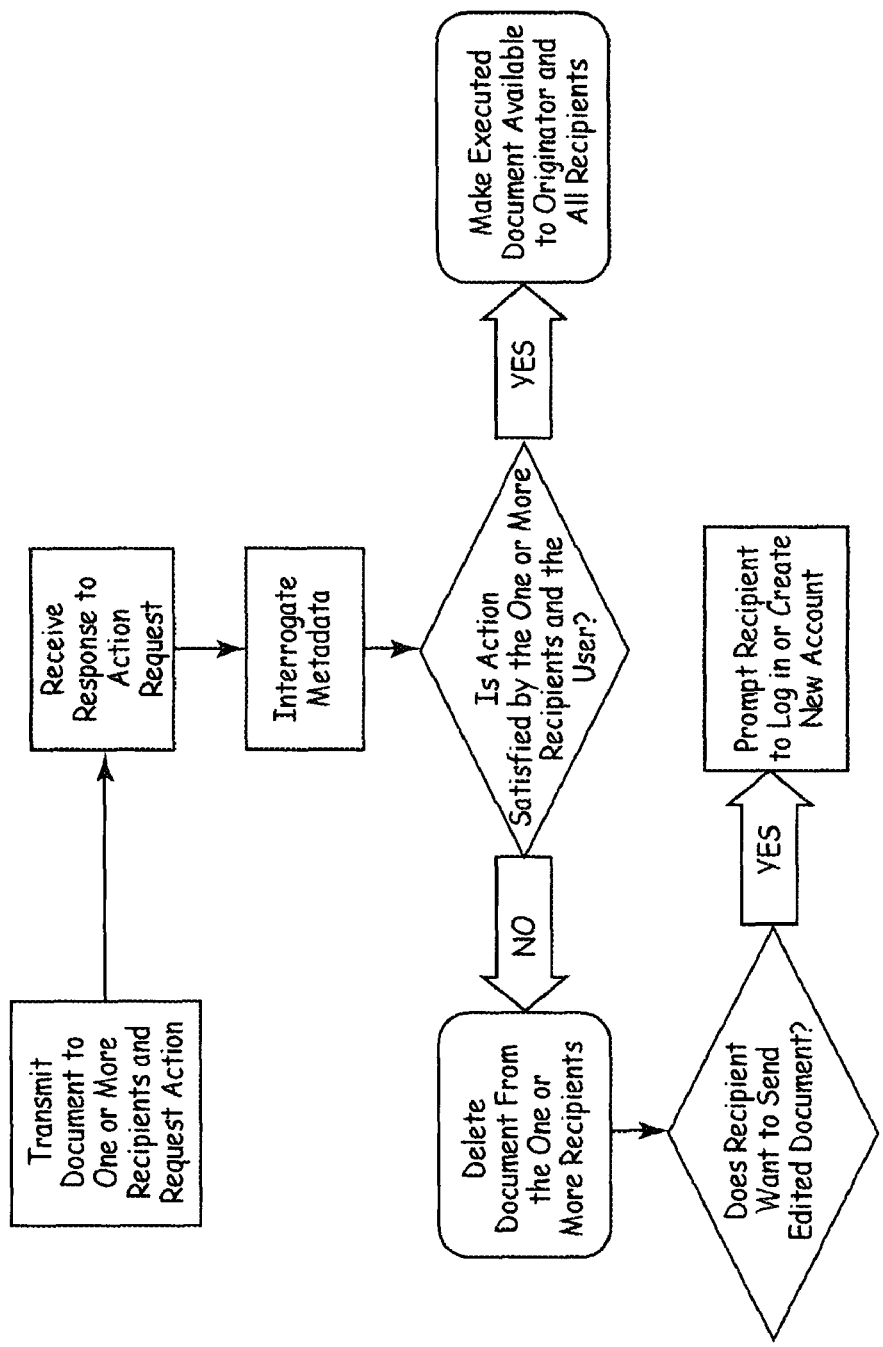
FIG. 10 is a flow diagram of an embodiment of the steps related to routing the document when the document is not satisfactorily executed or signatures are not obtained.

FIG. 10 is a flow diagram of an embodiment of the steps related to routing the document 206b when the document is not satisfactorily executed or signatures are not obtained because a recipient refuses to execute or sign the document. When the document is transmitted to one or more recipients for action 260, the system receives responses from these recipients 262 and interrogates the metadata 264 to determine if the action has been satisfied 266. In such event, the document may never be returned from the rejecting recipient, whose access to the document may be terminated 267. The system can be configured to receive a response from a recipient that the document is being rejected so that the originator can be notified.

Figure 2:
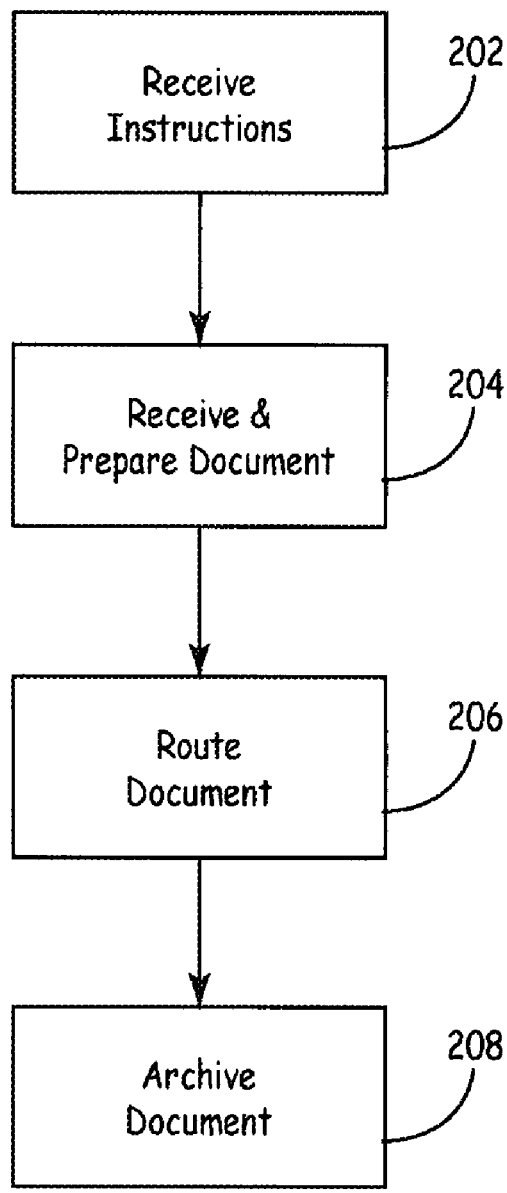
FIG. 2 is a flow diagram of an embodiment of a method for document exchange.
Figure 11:
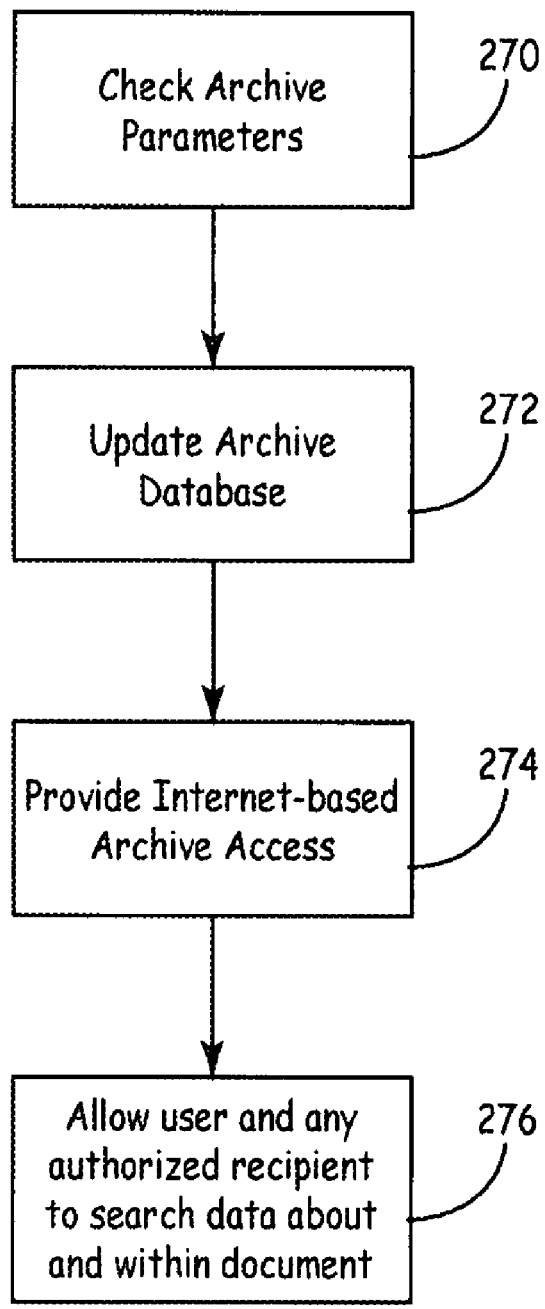
FIG. 11 is a flow diagram of an embodiment of the steps related to archiving an executed document.

Referring to FIG. 2, the archiving of the document 208 comprises the organization of an executed document within a database such that a plurality of documents can be accessed if security precautions are satisfied. Referring to FIG. 11, a representative embodiment of the archiving of an executed document is depicted with particular steps. In general, the document routing information contains information regarding the archiving of the document following execution of the document. These archival parameters are checked 270. Based on the archival parameters, the archive database is updated 272. This update of the archive database generally comprises storage of the executed document as well as the storage of the document access information. Using the updated archive data, the system generally provides access to the documents in the archive appropriately based on selected organization parameters and authentication of security information to provide access 274. The system may provide the originator and any authorized recipient to search data regarding the document and text within the document 276.

While the processes shown above are described in a linear fashion, for a particular user, the system can provide more sophisticated agreement management approaches with a visual organization that facilitates use of the system. A wide range of embodiments can be implemented to facilitate agreement management. One embodiment is depicted in FIG. 12.

Figure 12:
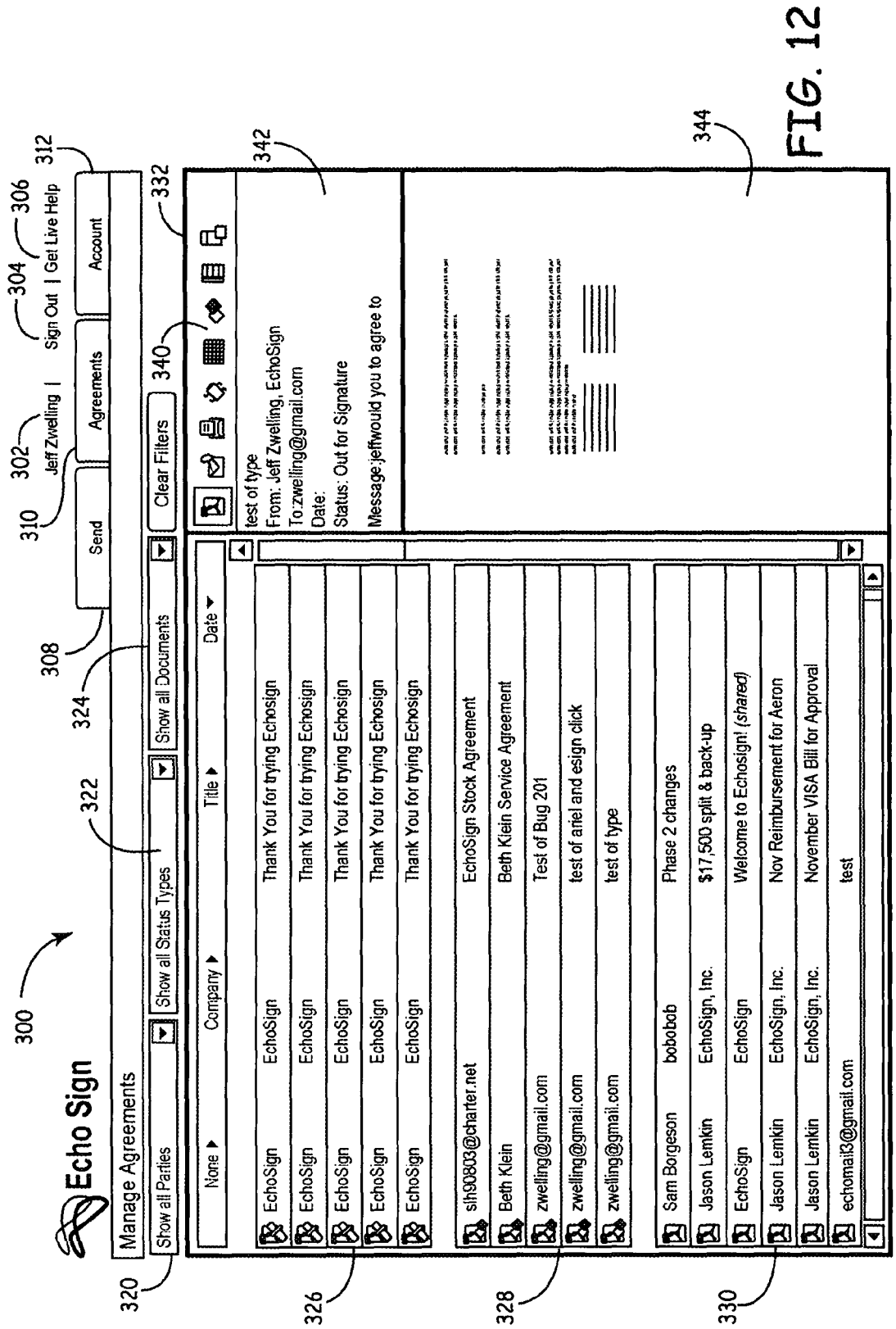
FIG. 12 is an image of a web page useful for the management of documents entered into the document management system.

FIG. 12 depicts a web page screen 300. In this embodiment, general login information is depicted at the top, including user name 302, logout command 304 and help command 306. Three tabs 308, 310, 312 provide selection of a screen format, respectively, for performing the input of instructions to initiate document transaction, for viewing the status of agreements and for reviewing account information, such as balances outstanding. The agreements page format is depicted over most of the page in FIG. 11.

With respect to the agreements page format, pull down menus 320, 322, 324 provide for the selection of the format for the agreement listings. The selections in the embodiment of FIG. 12 provide for viewing lists with all parties or only selected parties, with all status types or only selected status types and all document types or only selected document types. Thus, the agreements can be associated with a label to indicate its type. As depicted in FIG. 12, the document list is divided into groupings for a list of documents waiting for execution by the user 326, a list of user's documents awaiting signature by a third party 328 and a list of completed documents 330.

In this embodiment, clicking on a document within lists 326, 328, 330 provided a summary relating to the document in block 332. Summary block 332 comprises a one click command line 340 to manipulate the selected agreement, a summary of document parameters 342 and a view of the first page of the document 344. While this embodiment has one particular page layout, a person of ordinary skill in the art can select page layouts with different esthetic qualities and different information, as desired.

While the procedures described above relate generally with a process to execute documents, the archiving and document handling capabilities can be adapted for the archiving and communication of documents that are fully executed prior to introduction into the procedure. While these approaches do not require the full capabilities of the system, the system still provides significant efficiencies with respect to document transfer, maintenance and storage. For example, a signed standard purchase order, which has been signed by a purchaser, can be forwarded into the system. The signed purchase order can be archived with access to the seller so that the purchase order can be picked up. Similarly, a document with multiple signatures can be archived following execution to organize the documents for the convenience of one or more parties. The system above can be adapted to accommodate fully executed documents. Furthermore, the system can easily accommodate a mixture of documents in which certain documents need routing for signature while other documents received in completed form are archived and/or directed to a receiving party. Additionally, the system can easily accommodate documents in which a written or electronic approval, rather than a legal signature, is desire.

The agreement processing procedures are generally intended to be carried out automatically by the processors integrated into the system. While in normal operation the processes are performed automatically, it will be understood that human intervention can be used on occasion, for example, to overcome problems identified, to address concerns raised by a user and/or for quality control purposed to check certain functions of the system.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method using a document system comprising a computer with a processor for executing software instructions for document exchange directed to execution of a document by a plurality of parties, wherein the document is inputted with an input subsystem of the document system from an input source and stored for document exchange, the method comprising:
receiving routing information and identifying metadata through the input subsystem;
automatically storing the document with the input subsystem from the input source as specified in the routing information along with data automatically generated and structured based on the routing information and metadata;
routing the document for execution to the plurality of parties based on the routing information;
archiving the executed document in a document archive after automatically verifying that it has been executed by the plurality of parties; and
providing search capability with respect to documents that are executed in the document archive and documents that are pending execution, for identifying data regarding the document and/or for text within the document, to the plurality of parties identified in the routing information.

2. The method of claim 1 wherein the document image is converted to a pdf file format and wherein the searching is performed against either the text within the pdf file or the original text prior to conversion to pdf.

3. The method of claim 1 wherein the text searching is performed with a word processing version of a document that corresponds with a digital image of the document.

4. The method of claim 1 wherein the inputting of the document image comprises receiving a fax transmission.

5. The method of claim 1 wherein the inputting of the document comprises receiving the document via email.

6. The method of claim 1 wherein the document is stored in a database and is accessible to individuals in the routing information through a web site or web service to provide the searching capability.

7. The method of claim 1 wherein the routing information is associated with the document as metadata.

8. The method of claim 1 wherein the routing information is input through a web site or web-service connected with the interne.

9. The method of claim 1 wherein the document is locked to generally prevent modifications to the document by an individual performing text searching.

10. The method of claim 1 wherein access to the document is password protected.

11. The method of claim 1 wherein search capability is provided without providing editing capability.

12. The method of claim 1 further comprising automatically tracking execution by the one or more individuals and following up with any individual who has not completed execution.

13. The method of claim 1 further comprising providing the one or more individuals access to the document after the one or more individuals logs into the document system.

14. The method of claim 1 further comprising automatically sending to a party of the plurality of parties a reminder of a deadline to respond, wherein the timing of the reminder is based on the due date and the time since the document was routed to the individual.

15. A method using a document system comprising a computer with a processor for executing software instructions to perform the steps of document exchange directed to execution of a document, the method comprising comparing in an automated routine the image of a document returned by an individual on a routing list with a record of or an image of the document forwarded to the individual based on a request by an originator to confirm that the form of the returned document matches expected parameters corresponding to execution of the document, wherein the originator or the individual is notified if the form of the returned document does not match expected parameters.

16. The method of claim 15 wherein the document is returned by facsimile.

17. The method of claim 15 wherein the document is returned via email.

18. The method of claim 15 wherein the comparing of the image comprises identifying one or more signature block locations prior to distributing the document for execution and evaluating the presence of a signature based on image changes at the signature block.

19. The method of claim 18 wherein the remaining portions of the document is examined for changes in locations not identified as a signature block location.

20. The method of claim 18 wherein the individual that returned the document is sent an automatic message to ask if a modification was made to the document as an automatic process if a change is identified in the document away from a signature block that is consistent with added text and/or pages to the original document.

21. The method of claim 20 wherein the document is rerouted to previous signatories to confirm a modification made to the document.

22. The method of claim 15 wherein an electronic message is sent automatically to the individual to ask the individual about the signature if the expected parameters to indicate the presence of a physical signature are not detected.

23. The method of claim 15 wherein if the examination of the document indicates the presence of a signature, the routing information is examined to determine if execution of the document is complete or if the routing instruction indicate that the document is to be routed to additional individuals.

24. The method of claim 15 wherein the parties to the document are notified once the comparing of the document image indicates that all of the expected signatures have been obtained.

25. The method of claim 15 wherein the comparing of the document image is used to determine potential errors such as if any pages are missing from the returned document, if unexpected and/or additional pages have been included with the returned document, if significant copying errors have damaged the image of the original document, if the document needs inverting due to faxing in the document upside down, if the document needs resending due to a malfunctioning fax transmission or if the wrong document was returned.

26. The method of claim 15 wherein a party is notified when errors are detected in a returned document.

* * * * *

UNITED STATES PATENT AND TRADEMARK OFFICE
CERTIFICATE OF CORRECTION

| | | |
|---|---|---|
| PATENT NO. | : 7,996,367 B2 | |
| APPLICATION NO. | : 11/654390 | |
| DATED | : August 9, 2011 | |
| INVENTOR(S) | : Dan A. Foygel, Jason M. Lemkin and Jeffrey M. Zwelling | |

It is certified that error appears in the above-identified patent and that said Letters Patent is hereby corrected as shown below:

Column 16, Line 45 (Claim 8, Line 3)
Delete the word "interne" and insert the word --internet-- in place thereof Signed and Sealed this
Fourth Day of October, 2011

David J. Kappos
*Director of the United States Patent and Trademark Office*